United States Patent [19]

Murray

[11] 4,156,457
[45] May 29, 1979

[54] HEAT EXCHANGER SYSTEM

[75] Inventor: Ronald M. Murray, Cambridge, Mass.

[73] Assignee: The Badger Company, Cambridge, Mass.

[21] Appl. No.: 868,990

[22] Filed: Jan. 12, 1978

[51] Int. Cl.² .............................................. F28F 9/26
[52] U.S. Cl. .................................. 165/143; 165/158; 285/137 R; 285/363
[58] Field of Search ................... 165/143, 144, 145, 1, 165/158; 23/283, 284, 285, 288 E, 288 K; 285/137 R, 363

[56] References Cited

U.S. PATENT DOCUMENTS

| 3,376,917 | 4/1968 | Fristoe et al. | 165/39 |
| 3,439,738 | 4/1969 | Dixon et al. | 165/143 |
| 4,094,520 | 6/1978 | Ng et al. | 285/363 X |

Primary Examiner—Samuel Scott
Assistant Examiner—Margaret A. Focarino
Attorney, Agent, or Firm—Sewall P. Bronstein

[57] ABSTRACT

A sinuous shaped heat exchanger made up of a plurality of generally U-shaped heat exchanger units or sections or banks arranged with one of the ends of each of the U-shaped banks in opposing end to end relationship with one of the ends of a next succeeding bank in such a manner that places the outlet tube sheet of such bank supporting the outlet ends of the tubes of such bank face to face with the inlet tube sheet of the next bank supporting the inlet ends of the tubes of such next succeeding bank. The tubes at the outlet side of the outlet tube sheet and the tubes at the inlet side of the inlet tube sheet protrude toward each other beyond the surfaces of the tube sheets. A removable transition connecting piece in the form of an apertured plate with the same hole diameter and pitch as the tube sheets is sandwiched between the outlet tube sheet and the inlet tube sheet. It is removably secured in that position by securing it to the aforementioned ends of the banks. The protruding tubes from the two tube sheets fit snugly but removably into opposite ends of the holes in the transition plate thereby providing a plurality of continuous, unbroken and uninterrupted sinuous shaped passageways through and between the tubes of the plurality of banks.

9 Claims, 7 Drawing Figures

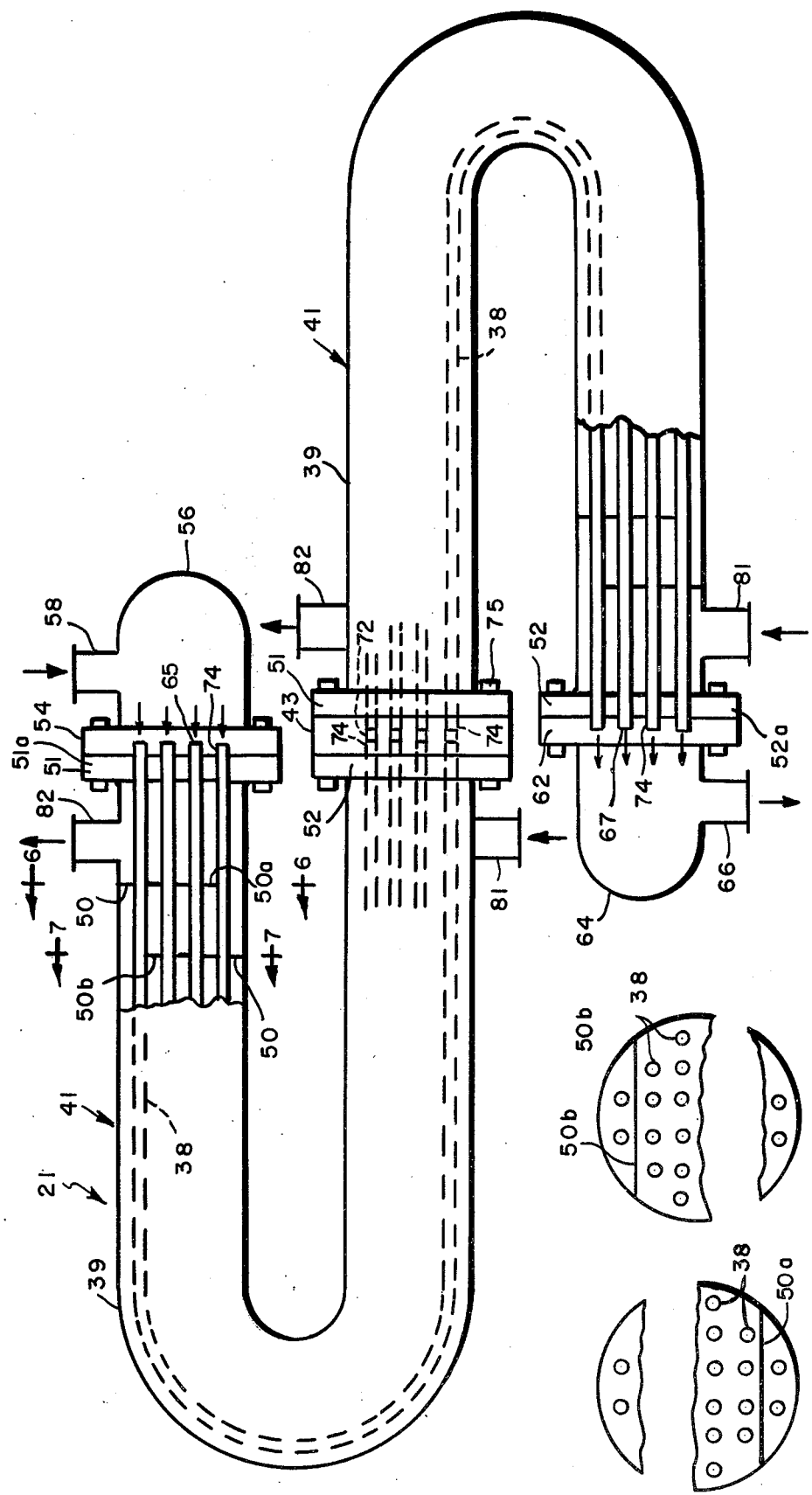

HEAT EXCHANGER SYSTEM

BACKGROUND OF THE INVENTION

In the catalytic liquid phase polymerization under positive pressure of olefins to polyolefins, such as polyethylene, polypropylene, polybutylene, etc., the reaction mass comprises polyolefin dissolved in liquid olefin monomer. The monomer is recovered from the dissolved polymer by preheating the liquid reaction mass under pressure in a multi-bank preheater to a temperature at which it is flashed off from the polymer (flash point) and is recycled back to the reactor together with fresh liquid olefin monomer feed, after being compressed to a liquid.

Conventional multi-pass, multi-bank, horizontal tubular preheaters have been used to preheat the reaction mass to the flash point of the liquid monomer. Such preheaters comprise horizontal banks of preheater tubes in series, each bank having a bundle or cluster of parallel heat transfer tubes mounted in a shell by means of a pair of tube sheets or plates at opposite ends of the shell with an inlet channel head or chamber at one end of the shell inletting into the inlet ends of the tubes of the cluster and an outlet channel head or chamber at the other end of the shell into which the outlet ends of the tubes exit. The ends of the tubes are sealed in holes in the tube sheets. In most cases, a single baffled outer heating shell (the heating fluid flows through the shell side and the reaction mass flows through the tubes) is used with the bundles or clusters of tubes of each bank located side by side in parallel relation to the others and with a single head at each end of the banks baffled to form an exit head for the tubes of each bank and an entry head for the tubes of the next succeeding bank in the series so that the flow from the exit ends of the cluster of tubes of each bank is baffled to turn about 180° through the head to the entry ends of the tubes of the next cluster.

In these conventional multi bank exchanger units where channel heads are used to direct the flow through each bank or pass in the exchanger unit as aforesaid, it has been found that phase separation occurs in the channel heads as the polyolefin/monomer mixture is heated. The heavy polymer mass drops out of solution in the channel heads and collects against the inlet tube sheet of one of the exchanger banks or passes. As the polymer accumulates in the channel head and against the tube sheet, it restricts the normal flow pattern through the lower tubed area of the exchanger. This in turn forces the gas phase to flow through the upper rows of tubes in the exchanger. The channel head will continue to fill with polymer until the pressure drop across the exchanger in the section where the gas phase is being forced to flow, reaches the point at which the heavy polymer mass is also forced into flowing sluggishly through the lower portions of the exchanger bundle.

In order to solve this problem inherent with the use of such conventional heat exchangers, generally U-shaped heat exchangers with an inlet head at one end and an outlet head at the other end, have been suggested comprising U-shaped heat exchanger tubes mounted in a U-shaped shell by means of tube sheets at each end of the shell and baffle plates mounted in the shell. One leg of the U-shaped tubes corresponds to one conventional bank of parallel tubes and the other corresponds to the next succeeding conventional bank of parallel tubes. In this way the output head of the one bank and the inlet head of the next succeeding bank are eliminated and the flow paths through the tubes are continuous and uninterrupted.

BRIEF DESCRIPTION OF THE INVENTION

In accordance with one aspect of the present invention, where a relatively long heat transfer path is required to achieve adequate heat transfer, the aforesaid U-shaped heat exchangers are joined end to end to provide a sinuous shape and path with the outlet ends of the tubes of each U-shaped heat exchanger being connected to the inlet ends of the tubes of the next succeeding U-shaped heat exchanger to provide sinuous shaped tubes and sinuous shaped, continuous uninterrupted and unbroken flow paths through such sinuous shaped tubes thereby eliminating the need for relatively long and cumbersome U-shaped tubes, or in the alternative, the need to use channel heads to change the direction of the flow at the inlet and outlet sides of the U-shaped exchangers. In this way the desired heat transfer surface is achieved without interruption in the flow path and without relatively long and cumbersome U-shaped tubes, and the problem of phase separation which occurs in the channel heads of multi bank exchanger units, including exchangers with U-tube configuration, is avoided.

The fabrication of these sinuous shaped heat-exchanger assemblies from the basic U-shaped members to achieve uninterrupted flow through the sinuous shaped heat exchanger tubes and to permit disassembly for cleaning and repair presents certain further problems.

In accordance with another aspect of the present invention, such fabrication is facilitated by arranging the U-shaped heat-exchanger units or banks end to end so that the outlet tube sheet of each U-shaped unit or bank (supporting the outlet ends of the U-shaped tubes of such bank) is face to face with the inlet tube sheet of the next succeeding U-shaped unit or bank (supporting the inlet ends of the U-shaped tubes of such bank) with the tube ends in the two sheets in axial alignment. The tubes at both the inlet and outlet side of each U-tube exchanger unit are arranged to protrude beyond the surface of the tube sheets. When the outlet side of the outlet tube sheet is placed face to face with the inlet side of the next bank, the tubes protrude towards each other beyond the surfaces of the tube sheets. A transition connecting piece or plate having holes of the same hole diameter and pitch as the holes in the tube sheets is located between such outlet and inlet tube sheets with the holes thereof in axial alignment with the holes in the two tube sheets. The protruding tubes from the outlet tube sheet and the inlet tube sheet fit snugly into opposite sides of the holes in the transition plate with the ends thereof facing, and in axial alignment with, each other and closely adjacent to each other to thereby form continuous unbroken and uninterrupted sinuous shaped passages in and between the tubes of the two U-shaped banks.

The thickness of the transition piece or plate and the length of the tube extensions protruding beyond the tube sheets are designed to allow adequate penetration of the tubes into the holes in the transition plate to make the seal as tight as possible. However, sealing gasket rings may be placed between the tube sheets and transition piece to form a liquid and airtight seal.

Preferably, the peripheral portion (flange) of the transition plate is removably secured between two flanges at the ends of the two U-shaped banks by conventional means, e.g., nuts and bolts.

To achieve optimum joint between the flange surfaces of the transition plate and the flanges of the heat exchanger units or banks, the transition plate is preferably recessed slightly centrally on both faces to clear the central tubed areas of the tube sheets. The recessed area can be increased in depth to produce additional clearance where the tubes are welded to the sheets.

Preferably the outer faces of the tube sheets may be raised slightly at the center, such raised central portions being received by the central recessed portions in the two faces of the transition plate.

With such a structure the U-shaped banks can be easily assembled merely by forcing the protruding ends of the tubes thereof facing each other into opposite sides of the holes in the transition plate followed by securing the transition plate between the tube sheets by two U-shaped banks. Tightening the nuts on the bolts will force the protruding ends of the tubes tightly into the holes in the transition piece. Multi bank units may be disconnected for cleaning or repair by removing the bolts and pulling the protruding ends of the tubes of at least one of the U-shaped banks out of the holes in the transition plate and as the tubes are designed to protrude from both the inlet and outlet sides of each U-shaped bank the units are readily interchangeable.

Tube sizes of less than 1 inch and more than 3/8 inch, preferably ¾ inch, give the best results.

Preferably the number of sinuous-shaped tubes is between 2 and 36, more preferably between 4 and 20.

The total length of each of the sinuous shaped tubes may vary between 20 and 360 feet, preferably between 40 and 200 feet, and the length of the U-shaped tubes of each U-shaped bank may vary between 5 and 30 feet, preferably between 5 and 15 feet.

The thickness of the transition piece is a function of the exchanger rating but is normally between 2 and 6 inches, more preferably between ½ and 4 inches, and the tubes protrude beyond their tube sheets between ¾ and 2½ inches, more preferably between ½ and 1½ inches.

DESCRIPTION OF THE DRAWINGS

The advantages of the invention will be further understood by the following drawings and detailed description thereof in which drawings:

FIG. 2 is a schematic in elevation and partly in section of the preheater of FIG. 1;

FIG. 6 is a section taken along the line 6—6 of FIG. 2

FIG. 7 is a section taken along the line 7—7 of FIG. 2.

DETAILED DESCRIPTION OF THE INVENTION

Figure 1:
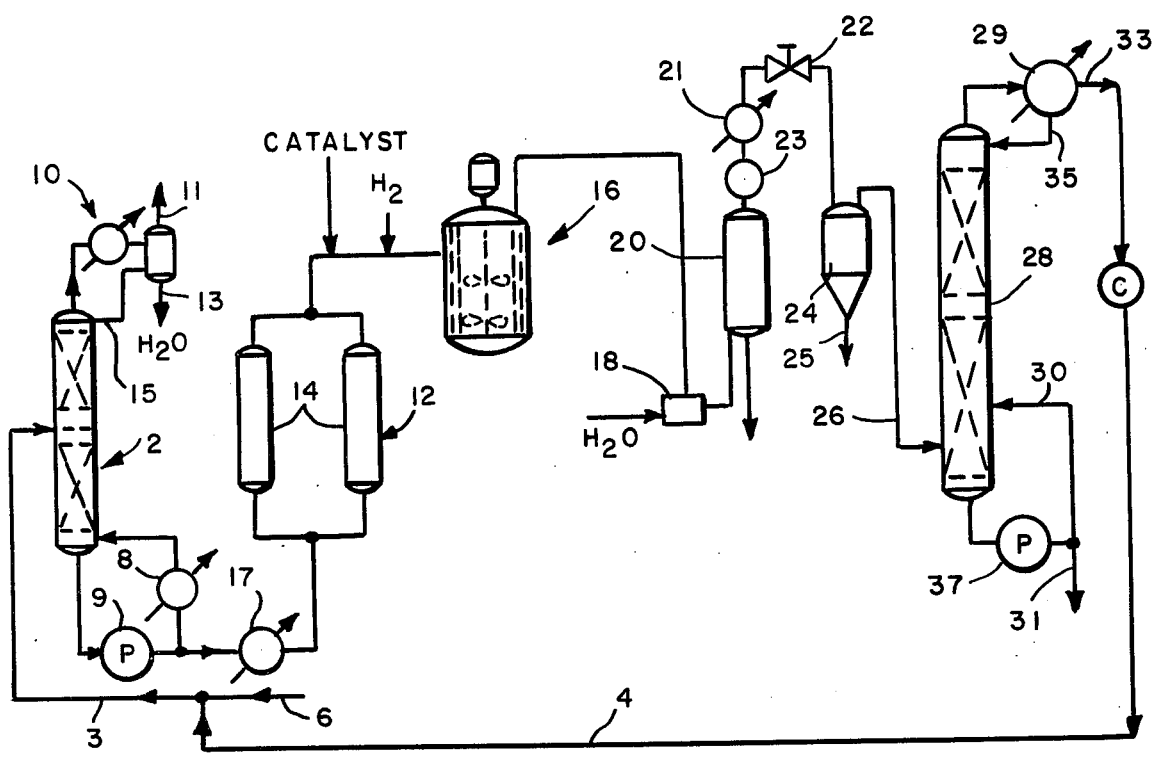
FIG. 1 is a schematic flow sheet of a method employing the heat exchanger construction of the present invention.

With reference to the figures, 2 represents a stripping column, e.g., a conventional packed tower, for stripping water and light ends from the mixture 3 of liquid monomer recycle 4 and fresh liquid monomer feed 6, both of which are under sufficient positive pressure to maintain them in a liquid state. Light ends are removed as a vapor at 11 from reflux condenser 10. Condensed olefin monomer is refluxed back to the top of tower 2 via 15 and condensed water is removed at 13.

The stripped liquid monomer from tower 2 is pumped by pump 9 through cooler 17 to reduce its temperature to well below reaction temperature (part of the exit from pump 9 is recycled via heater 8 back to the bottom of column 2) and thence to a conventional molecular sieve dryer 12 having two beds 14, which are cyclically switched by switching valves (not shown) on and off stream. The off-stream bed is regenerated to dry it by heating it and passing a regenerating gas through it while liquid monomer is passing through the on-stream bed.

The dried liquid monomer then flows to the liquid filled reactor 16 where it is admixed with catalyst and hydrogen (to control polymer chain length) while being strongly agitated.

The highly viscous reaction mass, comprising polyolefin dissolved in liquid monomer, passes to mixer 18 where it is mixed with water to kill the catalyst and thereby stop further reaction.

The reaction mass then passes from mixer 18 to a settling tank 20 in which the heavier water, having catalyst dissolved therein, is separated from the reaction mass as a lower layer. The upper layer of reaction mass still made up of olefin polymer dissolved in liquid monomer is pumped by pump 23 through a preheater 21 (FIGS. 1 through 8) and thence through a flash (reducing) valve 22 over which there is a large pressure drop to flash off the more volatile monomer as a vapor from the polymer into a flash tank 24, from which the polymer is removed at 25 and is extruded, cooled and pelletized and from which the flashed monomer vapor flows via 26 to the lower portion of quenching tower 28, where oligomers are stripped from the monomer vapor by a reflux stream of liquid oligomers. Vapor from the top of the tower 28 flows to a reflux condenser 29, from which the more volatile monomer vapors exit at 33 and from which the condensed liquid oligomers are refluxed via 35 back to the top of the tower to provide the reflux stream.

Part of the condensed liquid oligomer at the bottom of the tower is recycled back to the quench tower via pump 37 and line 30 and part is removed at 31.

The pressure of the monomer vapor 33 is raised by a compressor C to liquify it and the liquid monomer is recycled via line 4.

The preheater 21 (FIGS. 2 to 8) is made up of a plurality (two shown in FIGS. 2–8) of generally U-shaped heat exchanger units or banks 41 connected end to end as shown, by means of a disconnectable transition connecting plate 43 to form a generally sinuous shape as shown.

Each U-shaped bank comprises a plurality of generally U-shaped heat transfer tubes 38 supported in a generally U-shaped outer shell 39 by means of a pair of apertured tube sheets or plates 51 and 52 at opposite ends of the U-shaped tubes 38 and shell 39 and by means of a plurality of spaced baffle plates 50 secured in and along the lengths of the straight cylindrical leg portions of the shell 39, as shown. Tube sheets 51 and 52 are shown as being welded to the ends of the shell 39.

The baffle plates 50 function both to support the tubes 38 and to baffle the flow of heating fluid through the shell 39 and around the outside of the heat transfer tubes 38; they are conventional in configuration each comprising an apertured plate secured at its periphery to the inner wall of its shell with every other one having a segment 50a cut away at the lower side and the others each having a segment 50b cut away at the upper side for flow of heating medium thereby.

Secured to the free end of the shell of the first U-shaped unit 41 by means of mating flanges 51a (this is the peripheral part of the tube sheet or plate 51) and 54 is a polymer solution inlet flange with head 56 and a polymer solution inlet nozzle 58.

Secured to the free end of the shell of the last U-shaped bank by means of mating flanges 52a (this is the peripheral part of the tube sheet or plate 52) and 62 is a polymer solution exit flange with head 64 with a polymer solution outlet nozzle 66.

The U-shaped banks are disconnectably connected to each other by the connecting member 43 as follows:

As may be seen from FIGS. 2-7, the outlet tube sheet 52 of the first U-shaped bank 41 is face to face with the inlet tube sheet 51 of the next succeeding U-shaped bank 41 but with the plate 43 sandwiched between them. The ends of the tubes 38 of the first bank supported in the outlet tube sheet thereof are in axial alignment with the ends of the tubes 38 of the next bank supported in the inlet tube sheet thereof.

The connecting plate 43 has a plurality of holes 72 therein having the same hole diameter and pitch (same number and positional relationship) as the tube receiving holes of tube sheets 51 and 52, such holes 72 being in axial alignment with the tube receiving holes of the tube sheets.

The tubes 38 of each of the banks 41 protrude beyond the inlet and outlet tube sheets 51 and 52 thereof at 74, as shown in FIG. 2. Tubes 38 at the outlet side 68 of the outlet tube sheet 52 of the first bank 41 and the tubes 38 at the inlet side 70 of the tube sheet 51 of the next bank 41 protrude at 74 toward each other beyond such sides of the tube sheets and into the opposite ends of the holes 72 of plate 43, which snugly receive them with a tight fit, whereby continuous, unbroken and uninterrupted sinuous shaped passageways are provided by and between the tubes of the two U-shaped banks, as shown.

The thickness of the connecting plate 43 and the length of the tube extensions 74 are designed to allow good penetration of the tubes into the connecting plate to make the seal as tight as possible.

The connecting member 43 is removably secured to the connected opposed ends of the banks by a plurality of nuts and bolts 75 passing through axially aligned holes in the mating flanges formed by the radially outer portions of the plate 43 and of the tube sheets 51 and 52, as shown. An annular sealing gasket 76 is preferably located between the mating flanges. When the nuts and bolts 75 are tightened the two tube sheets and connecting plate 43 are pulled together into sealing contact with sealing ring 76 to force the protruding ends 74 of the tubes 38 further into the holes 72 in the connecting member 43.

To insure that the flange surfaces of the connecting plate make a proper joint with the heat exchanger flanges, the opposite faces of the connecting plate 43 may be recessed slightly at their center portions 78 to provide a slight clearance between such center portions and the center portions of the faces 68 and 70 of the tube sheets 51 and 52. Such faces 68 and 70 of the tube sheets may be raised slightly at their center portions 80.

The two banks may be separated from each other for cleaning or repair merely by removing the bolts bolting them to the connecting member and pulling the protruding ends 74 of at least one of the banks out of the holes 72 in the connecting member.

Since the inlet and outlet tube sheets of each individual unit are identical, with both sides having the tubes protruding beyond the surfaces of the tube sheets, the exchangers are readily interchangeable and can be easily removed and replaced by a spare unit as required.

Each of the U-shaped shells 39 has an inlet 81 for inletting heating medium into the shell and an outlet 82 for outletting the heating medium.

The tubes 38 are sealed in holes in sheets 51 and 52 to thereby seal the heating medium in the shells from the polymer solution in the tubes and in the chambers or heads 56 and 64.

The heating medium flows into each of the U-shaped shells at 81 and thence along the outside of the legs of the U-shaped tubes in such shell around baffles 50 and thence through the U bend of the shell around the U bends of the tubes and thence along the outside of the other legs of the U-shaped tubes in such shell and outlets at 82.

Thus, each U-shaped bank has its own heating medium flow, as shown, i.e., the heating medium does not flow directly from one set to the other.

As aforesaid, the tubes of both banks form continuous, sinuous-shaped tubes providing continuous uninterrupted sinuous-shaped passages for flow of polymer solution from the entry ends 65 of the tubes of the first bank to the exit ends 67 of the tubes of the last bank. In effect, the two U-shaped banks form a single pass preheater.

The heating medium may be any conventional heating medium of high boiling point well above flash temperature of the monomer at the particular pressure used. With polypropylene, the polymer solution is preheated in preheater 21 from 180° F. and 700–800 psig through the critical temperature and pressure of 205° F. and 615 psig for propylene to 380° F. at 450 psig, and any conventional heating medium having a boiling point of 470°–500° F. or higher may be used. Among the heating media which can be used is one sold under the trade name MobilTherm by Mobil Corp. and one sold under the trade name DowTherm by Dow Corp.

Figure 3:
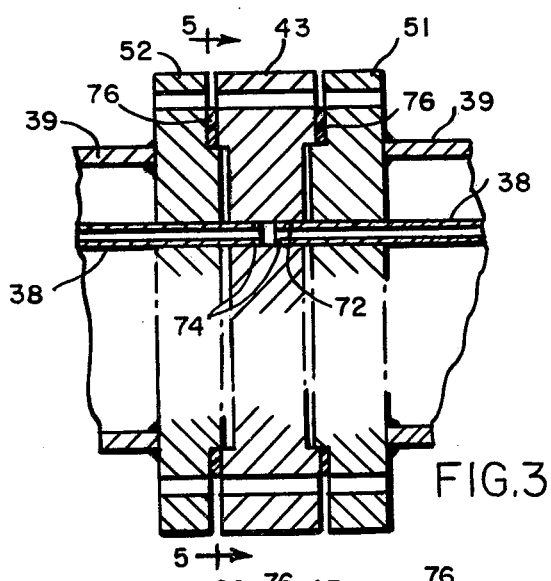
FIG. 3 is an enlarged schematic section in elevation of the disconnectable transition connecting plate of FIG. 2 connecting two U-shaped heat exchanger banks and of the connected end portions of the two banks.
Figure 4:
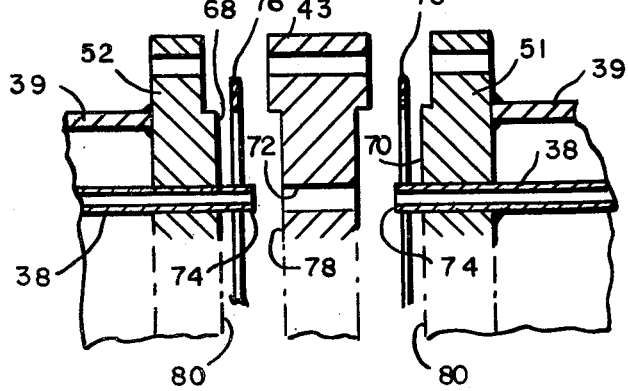
FIG. 4 is a view like FIG. 3 but with the two banks and connecting plate disconnected.
Figure 5:
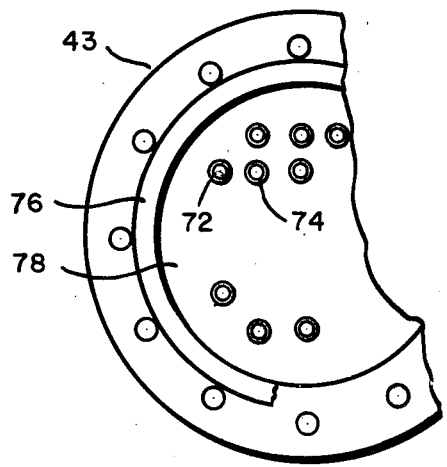
FIG. 5 is a section taken along the line 5—5 of FIG. 3.

Although only two U-shaped banks have been shown connected together in FIGS. 2-8, any number may be connected end to end with only the first having a polymer inlet at its free end and only the last having a polymer outlet at its free end. For example, if it is desired to connect three banks then a third U-shaped bank would be connected between the two banks shown in FIG. 2 with the inlet tube sheet 51 thereof being connected with the outlet tube sheet 52 of the first bank by means of a connecting plate 43 as shown in FIGS. 2 and 3 and with the outlet tube sheet 52 thereof being connected with the inlet tube sheet 51 of the last bank in FIG. 2 by means of another connecting plate 43 as shown in FIG. 2 to provide sinuous-shaped, continuous, unbroken and uninterrupted passages from the inlet ends of the tubes of the first bank to the outlet ends of the tubes of the last bank.

Although the connecting plates of the instant invention have been shown and described as removably connecting U-shaped heat exchanger units, they can be used equally as well to removably connect straight heat exchanger units.

It is clear that phase separation adversely affects heat transfer rates and pressure drop in multi bank or multi pass exchanger units and that the connecting transition pipes of the instant invention used in conjunction with U tube type heat exchangers insure the continuity of mixed phase flow in multi bank exchanger units.

EXAMPLE

This example is given for a polypropylene plant having a capacity of 15,000,000 pounds of polypropylene per year.

The temperature, pressure, composition, construction and other properties of the various streams and equipment shown in FIG. 1 are set forth below, with reference to the number representing the stream or element of the equipment appearing in FIG. 1.

- Stream 6—Fresh liquid propylene feed at a rate of 1880 lbs./hr. and at 70° F. and 175 psig
- Stream 4—Recycle liquid propylene recycled as described above at a ratio of recycle to freshfeed of 5 to 10 (7 is preferred) recycle to 1 fresh feed at a temperature of 115° F. and a pressure of 235 psig and containing less than 50 ppm of polymer.
- Stripper 2—Packed tower—Liquid propylene monomer—stripping carried out at 170° F. and 400 psig. Reduce water content of monomer to 10–20 ppm.
- Cooler 17—Entry to cooler 170° F. and 400 psig. Exit from cooler 100° F. and 400 psig.
- Mol. Sieve Dryer 12—Entry and exit 100° F. and 400 psig—regeneration of off-stream dryer at 300° F. and atmospheric pressure.
- Catalyst—Conventional Ziegler catalyst 0.5 to 1 lb. catalyst per 100 pounds of fresh monomer feed.
- Hydrogen—0.5 to 0.15 lbs. per 100 pounds of fresh monomer feed to control polymer chain length.
- Reactor 16—Reactor Temperature 145° F. Pressure 450 psig. Completely liquid filled. Vigorous mixing to ensure good mixing of catalyst and $H_2$ with liquid monomer. Reaction mass outlet—polypropylene dissolved in liquid Propylene monomer at 145° F. and 450 psig. Ratio of polymer to liquid monomer—20 reaction mass—highly viscous.
- Mixer 18—Reaction mass inlet—same as reaction mass outlet of reactor 16. Motionless Mixer (high shear intensive mixer) sold under that name by Kenics Incorporated. Monel. water added at 150° F. Exit is 180° F.—$\Delta T$ by heat of mixing—and 450 psig.
- Settler 20—Inlet and outlet 180° F. and 450 psig. Residence time ½-2 hours—polymer in monomer oil phase goes to top—aqueous phase containing catalyst goes to bottom and is removed, neutralized and discarded.
- Heat Exchanger 21—Inlet 180° F. and 700–800 psig achieved by pump 23. Outlet 380° F. and 450 psig. Heating fluid—high boiling Dowtherm sold by Dow Corp. Bp 470°–500° F. Fig. 2 arrangement. Tube ID-¾ inch. Total length of Sinuous-shaped tubes 80 Ft. Number of Sinuous-shaped tubes 250.
- Flash Valve 22—Mason Neilan reducing valve—inlet 380° F. and 450 psig—outlet 85 psig and 300° F. Flashed monomer vapor contains less volatile oligomers and entrained polymer.
- Quenching Tower 28—Packed Tower—Inlet monomer vapor at 300° F. and 85 psig Liquid oligomer at 31 is 30°–60° F. and 85 psig Outlet monomer vapor at 33 is 50° F. and 85 psig.

The above description and accompanying drawings of a preferred embodiment of the invention are for purposes of illustration only and it is not intended that the invention be limited thereto or thereby but only to the apparatus claimed in the appended claims and their equivalents.

I claim:

1. A heat exchanger comprising a plurality of heat exchanger sections in end to end relation with each other, each section comprising a plurality of heat exchanger tubes supported in a shell at least in part by tube sheets at the end portions of said section, each section having an exit end facing and adjacent to an inlet end of another section, whereby the exit ends of the tubes of said section and the tube sheet supporting such exit ends of said tubes face and are adjacent to the inlet ends of the tubes of the other section and to the tube sheet of such other section supporting said inlet ends of said tubes, said ends of said tubes of said sections protruding toward each other beyond said tube sheets supporting them, and means for disconnectably connecting said adjacent ends of said sections, said last mentioned means comprising plate means having a plurality of holes therethrough, said protruding ends of said tubes of said each section being snugly received in said holes in said plate means at one end thereof and the protruding ends of said tubes of said other section being snugly received in said holes in said plate means at the other end thereof, whereby the tubes of said sections are connected to each other to provide continuous and uninterrupted passageways for passage of fluid through the tubes of said each section to and through the tubes of the other section.

2. A heat exchanger according to claim 1 including means for sealing against the escape of fluid from said tubes of said sections and said tube-connecting holes in said plate means.

3. A heat exchanger according to claim 1, said adjacent ends of said sections being flanged and said plate means comprising a plate removably secured to the flanges of said adjacent ends of said sections and located between the tube sheets at said adjacent ends of said sections.

4. A heat exchanger according to claim 1, said sections being generally U-shaped and comprising generally U-shaped heat exchanger tubes supported in a generally U-shaped shell, said sections when connected by said connecting means forming a sinuous-shaped heat exchanger and said tubes of said sections when connected by said connecting means forming sinuous-shaped continuous unbroken and uninterrupted passages for flow of fluid therethrough.

5. A heat exchanger according to claim 4, the shell of each section having a heat exchanger fluid inlet at one end and a heat exchanger fluid outlet at the other end, the tubes in each section being sealed in holes in the tube sheets supporting them at opposite end portions of said section so that said heat exchanger fluid is sealed against flow from one side of said tube sheets to the other.

6. A heat exchanger according to claim 4, the free end of the end heat exchanger section at one end of said plurality of heat exchangers having a chamber, said chamber inletting into the tubes of said end section and having a fluid inlet, and the free end of the end heat exchanger section at the other end of said plurality of heat exchanger sections having a chamber into which the tubes of said last mentioned end section outlet, said last mentioned chamber having a fluid outlet.

7. A heat exchanger according to claim 1, the central portions of the opposite faces of said connecting plate means being recessed.

8. A heat exchanger according to claim 1, wherein the inlet ends of the tubes of said each section also protrude beyond the tube sheet supporting them and the exit ends of the tubes of said other section also protrude beyond the tube sheet supporting them, whereby said sections are readily interchangeable or can be replaced by a spare unit while the original unit is being cleaned or repaired.

9. A heat exchanger according to claim 8, whereby additional heat transfer surface may be added to the exchanger bank by adding additional sections.

* * * * *